Feb. 18, 1958     H. O. LEIPOLD     2,824,209
STRIP HEATER
Filed July 20, 1956
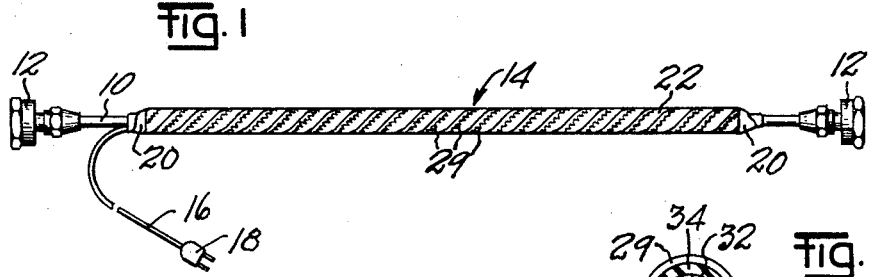
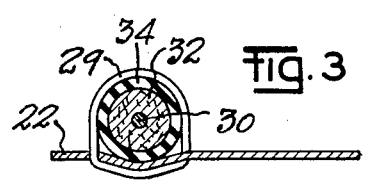
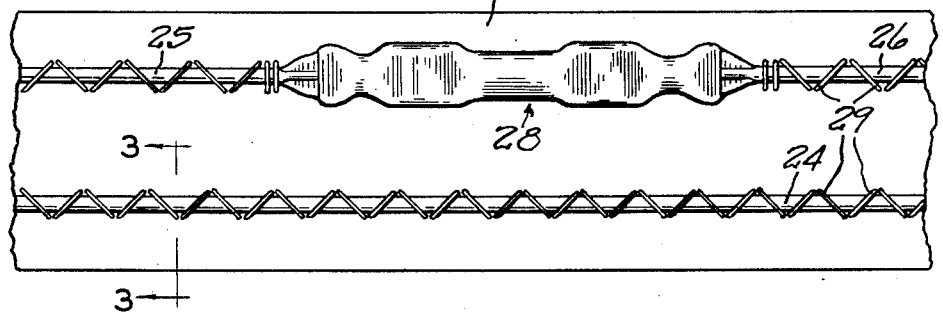
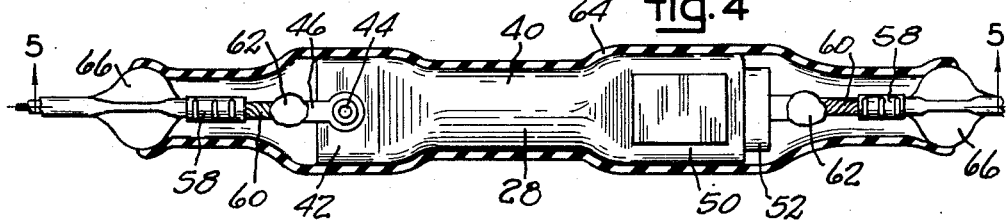
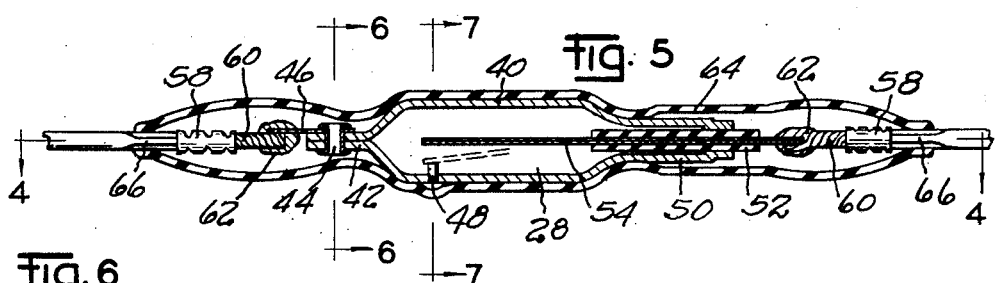
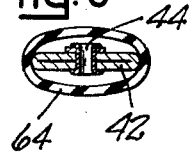
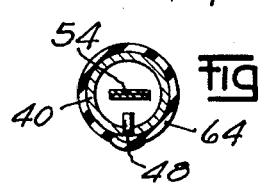
INVENTOR.
HERBERT O. LEIPOLD.
BY
Eugene C. Knoblock
ATTORNEY.

United States Patent Office 2,824,209
Patented Feb. 18, 1958

2,824,209

STRIP HEATER

Herbert O. Leipold, South Bend, Ind., assignor to Welcraft Products Co., Inc., New Carlisle, Ind., a corporation of Indiana Application July 20, 1956, Serial No. 599,203

8 Claims. (Cl. 219—46)

This invention relates to a strip heater, and more particularly to an electric heater that may be mounted upon the exterior of an object to heat the same.

The primary object of this invention is to provide a novel, simple, inexpensive construction of strip heater readily applicable to an object to be heated in a protected relation with respect to the elements when the part is located out of doors and in an electrically insulated relation to the part to be heated, and which strip heater is characterized by a thermostat responsive to the temperature of the part to be heated for controlling operation of the strip heater.

A further object is to provide a strip heater with an insulated electrical heating element whose insulation includes a thermoplastic outer covering and a thermostat connected in said heating element between spaced parts thereof, in which the electrical connection of the thermostat to each part of the heating element projects beyond the insulation of the heating element and in which the thermostat housing is electrically conductive, wherein a thermoplastic tubular sheath encloses the thermostat and the leads projecting therefrom and has a substantially shrink fit thereon to facilitate heat transfer therethrough to the thermostat and in which the ends of the tubular thermoplastic thermostat sheath are bonded to the thermoplastic insulation of the heating elements to provide effective electrical insulation for the assembly and to protect the parts against exposure to the weather.

A further object is to provide a thermostat for use with a strip heater, comprising a tubular metal electrically conductive housing and electrical conductors projecting from the end thereof and a thermoplastic sheath of tubular character substantially evacuated of contained air and having a shrink fit upon the thermostat housing and the leads projecting from the ends thereof.

Other objects will be apparent from the following specification.

In the drawing:

Fig. 1 is a view in elevation of the strip heater applied to a pipe or conduit;

Fig. 2 is an enlarged face view of a fragment of the strip heater illustrating the thermostat associated therewith;

Fig. 3 is an enlarged fragmentary transverse sectional view taken on line 3—3 of Fig. 2;

Fig. 4 is an enlarged longitudinal sectional view of the thermostat and related parts taken on line 4—4 of Fig. 5;

Fig. 5 is a longitudinal sectional view taken on line 5—5 of Fig. 4 and illustrating the thermostat itself in cross-section;

Fig. 6 is a transverse sectional view taken on line 6—6 of Fig. 5; and

Fig. 7 is a transverse sectional view taken on line 7—7 of Fig. 5.

Referring to the drawing which illustrates the preferred embodiment of the invention, the numeral 10 designates a pipe or conduit having couplings 12 at its opposite ends adapted for detachable connection to other conduits, valves, fixtures or containers. The conduit 10 will preferably be of the type used in an exposed location so as to be subject to freezing or to increase in the density and flow-resisting properties of liquids passing therethrough. One installation of this type is a fuel oil line leading from a fuel oil tank to a fuel burner of a mobile home located at a semi-permanent station, as in a trailer park, with a conduit extending externally of the vehicle so as to be subject to outdoor temperature during winter weather, in which the operation of a heater in a mobile home is required. Another example of installation would be a conduit detachably connecting a central water supply system in a trailer park with the plumbing system of a mobile home stationed or parked at such trailer park.

My improved strip heater constitutes a unit 14 adapted to be wrapped around the exposed part of the conduit 10 or any selected part thereof and to be provided with a projecting electrical cord 16 with an electrical connector 18 at its end to accommodate electrical connection of the heater with an electrical outlet in an electric line connected to a source of power. The heating strip unit 14 is preferably elongated and flexible to accommodate wrapping thereof around the conduit in snug condition and anchorage thereof at its ends at 20 by any suitable means, for example, by means of pressure sensitive adhesive tape, or the like.

The strip heater has a base or carrier strip 22 which is formed of any suitable material. I prefer to employ a heavy brand of paper, such as kraft paper crinkled by transversely extending folds to a condition known commonly in the art as crepe paper, which paper preferably will be treated to render it moisture resistant as by means of asphaltic or thermoplastic surface coating or the like. The carrier strip 22 mounts thereon one or more runs of an electrical heating element of flexible insulated character, such as the connected runs 24, 25 and 26 shown in Fig. 2, of which runs 25 and 26 constitute parts of one longitudinally extending run interconnected by a thermostat unit 28. The runs 24, 25 and 26 will extend for any desired portion of the length of the strip carrier 22 and will preferably be positioned to extend longitudinally thereof and in spaced relation, with anchorage therefor provided by any suitable means, and preferably by thread or stitching 29, looped around the heating element and passed through the carrier strip 22. As seen in Fig. 2 the anchorage of the parts 25 and 26 of the run interconnected by the thermostat to carrier strip 22 by anchoring means 29 will preferably terminate in spaced relation to the thermostat 28 so that the thermostat 28 will be free from carrier strip 22. This is optional, however, and the thermostat may be anchored to the carrier strip if desired by the same means 29 or any other means found suitable.

The electrical heating elements may be formed of any suitable character or construction, and I prefer to employ a construction of the character illustrated in Fig. 3 wherein the heating element constitutes a resistance wire or wires 30 surrounded by insulation which may include fibers or threads 32, or other suitable inner insulation, and an outer insulating sheath 34, preferably formed of thermoplastic material such as a vinyl type synthetic resin material of flexible character, as well known in the electrical conductor art. The heating element so constructed will be flexible and will be effectively insulated electrically.

The thermostat 28 employed in the device may be of any type found suitable, and I prefer to employ a type of the construction and character illustrated in Figs. 4 to 7, characterized by an electrically conductive tubular sheath or housing 40 which preferably has one end portion 42 thereof crimped or flattened to receive therethrough a metallic and conductive rivet, screw or other fastener 44 for securing an electrically conductive metallic terminal member 46 in electrically conductive relation to the housing 40 to project longitudinally therefrom. The housing carries a metallic rivet stud or other member 48 constituting an electrical terminal projecting into the interior of the tube 40 adjacent the end 42 thereof. The other end portion 50 of the tube 40 is compressed or flattened about a tube or sleeve 52 of insulation material, which in turn encircles one end portion of a bi-metal thermostatic strip 54 which projects longitudinally into the tube 40 adjacent to but spaced from the terminal 48 while at a temperature above freezing. The bi-metal strip 44 is so biased that it is adapted to flex and bend to the dotted line position shown in Fig. 5 for engagement with the electrical terminal 48 when the temperature reaches a predetermined low level, such as a freezing temperature.

The electrical conductors 30 of the runs 25 and 26 are bared at their ends which are preferably connected by clamping type electrical connectors 58 to electrical conductors 60 which may be suitably electrically connected to the thermostat terminal 46 and to the outer end of the bimetal strip 54 projecting from the housing 40 by any suitable means, such as solder 62.

A tube 64 of a length equal to or slightly greater than the spacing between the adjacent ends of the conductor runs 25, 26 is applied over the thermostat 40 and the portions which electrically connect the same to the runs 25, 26 preferably including the electrical connectors 58. The tube 64 is formed of electrical insulating material, such as a thermoplastic resin of the vinyl type, which is flexible and adapted for a shrink fit upon the thermostat housing 40 incident to evacuation of air therefrom and heating thereof in any manner well understood in the art. The opposite ends of the tube 40 are preferably bonded, as by a heat seal action, to the plastic sheaths 34 of the runs 25 and 26 of the electrical conductor. Thus the sheaths 34 may be subjected to pressure at their ends 66 to flatten the same while simultaneously being subjected to heat sufficient to bond the tube 64 thereto, as in the presence of a bonding agent or a solvent. The evacuation of the plastic sheath or tube 64 insures substantially continuous face contact thereof with the housing 40 of the thermostat so that heat transfer to the thermostat will be efficient and minimum insulation against heat will result from air pocketed within the sheath 64.

The construction makes possible the formation of a thermostat of small cross-sectional size and short length which can have at least a measure of flexibility in the event that the tube 40 is formed of thin ductile electrically conductive metal, such as copper. Thus it is possible to maintain the cross-sectional dimensions of a thermostat only slightly greater than the cross-section of the electrical heating elements so that the thermostat will not interfere with helical wrapping of the carrier strip 22 around the conduit or other member 10 whose temperature is to be controlled, and further there will be little bulging of the wrapping at the point at which the thermostat is located. The freedom of the thermostat 28 from the carrier strip 22 permits the same to accommodate itself to the member 10 with respect to its position, and this shifting for positioning purposes, coupled with flexibility of the thermostat and its small diameter cross-section, enables application of the strip to a conduit of small diameter. As an example of the sizes of the parts, it is found possible to apply a strip heater very effectively to a conduit, such as a copper tube, having an outer diameter in the order of 3/8 of an inch, in cases where the thermostat tube has an outer diameter in the order of 5/16 of an inch and a length in the order of 1½ inches, and were the overall length of the tubular sheath 64 is in the order of 3½ inches.

In applying the strip heater about the object to be heated, the strip heater will be wound thereabout in a helical manner having a long lead with the electrical heating element and the thermostat innermost for contact with the object. The strip 22 serves as means to uniformly space or position the heating elements anchored thereby along the length of the conduit or body 10 and the successive convolutions thereof. Additional functions which are served by the carrier strip 22 are protection of the heating element and thermostat from the elements, concealment thereof from children and others who might tamper therewith, and positioning thereof for direct contact with the element to be heated. Since paper is a good insulator, the carrier strip 22 also serves to confine the heat generated by the heating element of the device. Flexibility of the strip permits ready application thereof to the object to be heated, and its connection by simple means, such as adhesive strips, anchoring the ends of the strips 22 to the body 10.

The direct contact of the thermostat sheath with the member 10 and the contact of the plastic sheath 64 with the thermostat body 40 resulting from the substantially evacuated condition within the sheath, provide sensitivity of the thermostat to changes in the temperature of the member 10. The flexibility of the tube 64 of the thermostat tube 40, and of the electrical connections of the thermostat 28 with the heater runs 25 and 26, insure that a snug fit of the thermostat against the body 10 will occur, and maximum efficiency of heat transfer will be produced. The endless cross-sectional nature of the tubular sheath 64 and the bonding thereof to the conductor sheaths 34 provides an effective electrical insulation for all electrically conductive parts with respect to both the member 10 and external objects which may be touched thereby including persons handling the mechanism. All of these properties render the structure exceedingly well suited for its purpose, provide an efficient structure having minimum heat losses and minimum exposure to damage or injury. Therefore, the device can serve satisfactorily in many locations and for many purposes to produce economical heating of exposed parts or objects during freezing weather with a sensitive control in the nature of a thermostatic switch rendering the device non-functioning at all times in which temperature conditions are such that no requirement for heating operation exists but automatically functioning to generate heat whenever danger of freezing occurs.

While the preferred form of the invention has been illustrated and described herein, it will be understood that changes in the construction may be made within the scope of the appended claims without departing from the spirit of the invention.

I claim:

1. A strip heater adapted to be wound around a conduit, comprising a flexible carrier strip, a two-part flexible electric heating element having an insulation enclosure, a thermostat electrically connected between said parts of said heating element, an electrically insulating flexible sheath encasing said thermostat and joined at its ends to said heating element enclosure, and means connecting said element to said strip said thermostat being located intermediate the length of said strip for response to the temperature of said conduit.

2. A strip heater adapted to be wound around a conduit, comprising a flexible carrier strip, a two-part flexible elongated electric heating element having an insulation enclosure, a thermostat electrically connected between said parts intermediate the length of said heating element, an electrically insulating flexible sheath encasing said thermostat and joined at its ends to said heating element enclosure, and means connecting said element to said strip, said sheath engaging said thermostat and said conduit for rapid heat transfer between said conduit and said thermostat.

3. A strip heater adapted to be wound around a conduit, comprising a flexible carrier strip, a two-part flexible electric heating element having an insulation enclosure, a thermostat electrically connected between said parts of said heating element, an electrically insulating flexible sheath encasing said thermostat and joined at its ends to said heating element enclosure, and means connecting said element to said strip, said sheath and enclosure being formed of thermoplastic material and being bonded together, said sheath being sealed and substantially evacuated of contained air.

4. A strip heater adapted to be wound around a conduit, comprising a flexible elongated carrier strip, a two-part flexible elongated electric heating element having an insulation enclosure, a thermostat electrically connected between said parts intermediate the length of said heating element, an electrically insulating flexible sheath encasing said thermostat and joined at its ends to said heating element enclosure, and means connecting said element to said strip, said sheath having a shrink fit on said thermostat and being adapted to engage said conduit.

5. A strip heater adapted to be wound around a conduit, comprising a flexible elongated carrier strip, a two-part flexible elongated electric heating element having an insulation enclosure, a thermostat electrically connected between said parts intermediate the length of said heating element, an electrically insulating flexible sheath encasing said thermostat and joined at its ends to said heating element enclosure, and means connecting said element to said strip, said sheath and heating element enclosure being formed of thermoplastic material, said electric connections between said wire and thermostat including flexible electrically conductive parts projecting beyond the wire enclosure to the thermostat, said sheath encasing said projecting electrically conductive parts and being adapted to engage said conduit.

6. A strip heater adapted to be wound around a conduit, comprising a flexible carrier strip, a two-part flexible electric heating element having an insulation enclosure, a thermostat electrically connected between said parts of said heating element, an electrically insulating flexible sheath encasing said thermostat and joined at its ends to said heating element enclosure, and means connecting said element to said strip, said carrier strip constituting a paper web, said heating element extending longitudinally of said web spaced from the side edges of the web.

7. A strip heater adapted to be wound around a conduit, comprising a flexible carrier strip, a two-part flexible electric heating element having an insulation enclosure, a thermostat electrically connected between said parts of said heating element, an electrically insulating flexible sheath encasing said thermostat and joined at its ends to said heating element enclosure, said carrier strip constituting a crinkled paper web, and stitching anchoring said heating element to said web.

8. A strip heater adapted to be wound around a conduit, comprising a flexible carrier strip, a two-part flexible electric heating element having an insulation enclosure, a thermostat electrically connected between said parts of said heating element, an electrically insulating flexible sheath encasing said thermostat and joined at its ends to said heating element enclosure, and means connecting said element to said strip, said thermostat constituting a conductive tube electrically connected at one end thereof to one heating element part, and a bimetallic strip encircled by an insulation sleeve gripped by the other end of the tube and electrically connected to the other heating element part, said bimetallic strip being normally out of contact with said conductive tube and flexing in response to a low temperature condition to effect electric contact with said conductive tube.

References Cited in the file of this patent

UNITED STATES PATENTS

| | | |
|---|---|---|
| 1,809,714 | Mathews | June 19, 1931 |
| 1,936,391 | Harrower | Nov. 21, 1933 |
| 2,274,839 | Marick | Mar. 3, 1942 |
| 2,403,803 | Kearsley | July 9, 1946 |
| 2,719,907 | Combs | Oct. 4, 1955 |